United States Patent [19]

Ishida et al.

[11] Patent Number: 6,130,897
[45] Date of Patent: Oct. 10, 2000

[54] TIME DIVISION MULTIPLE ACCESS FDD/TDD DUAL MODE RADIO AND A TIME DIVISION MULTIPLE ACCESS TDD DUAL BAND SYSTEM

[75] Inventors: Kaoru Ishida, Shijonawate; Hiroaki Kosugi, Hirakata; Takashi Enoki, Yokohama; Yoichi Morinaga, Yokohama; Makoto Aisaka, Yokohama, all of Japan

[73] Assignee: Matsushita Electric Industrial Co., Ltd., Osaka, Japan

[21] Appl. No.: 08/925,574

[22] Filed: Sep. 8, 1997

[30] Foreign Application Priority Data

Sep. 9, 1996 [JP] Japan .................................. 8-237413

[51] Int. Cl.[7] ................................ H04J 4/00; H04J 3/00; H04L 5/16
[52] U.S. Cl. ...................... 370/478; 370/280; 370/281; 370/276
[58] Field of Search ..................................... 370/276, 280, 370/281, 282, 294, 295, 466, 478, 442

[56] References Cited

U.S. PATENT DOCUMENTS

| | | |
|---|---|---|
| 5,475,677 | 12/1995 | Arnold et al. .......................... 370/280 |
| 5,519,691 | 5/1996 | Darcie et al. ........................... 370/331 |
| 5,648,985 | 7/1997 | Bjerede et al. ......................... 375/219 |
| 5,657,344 | 8/1997 | Na .......................................... 375/219 |
| 5,812,522 | 9/1998 | Lee et al. ................................ 370/206 |
| 5,926,466 | 7/1999 | Ishida et al. ........................... 370/280 |

*Primary Examiner*—Hassan Kizou
*Assistant Examiner*—Saba Tsegaye
*Attorney, Agent, or Firm*—Ratner & Prestia

[57] ABSTRACT

A Time Division Multiple Access FDD/TDD dual mode system includes a switch having first and second common terminals and first and second terminals. Also included are a TDD demodulation circuit for demodulating a TDD received signal from the first common terminal; a FDD demodulation circuit for demodulating a FDD received signal; and a FDD/TDD modulation circuit for modulating and impressing the modulated signal onto the second common terminal. A FDD transmission band selection circuit is connected to the first terminal, and a TDD transmission-reception band selection circuit is connected to the second terminal. The first common terminal of the switch is connected to the second terminal during TDD reception, whereas the second common terminal is connected to the first terminal during FDD transmission and to the second terminal during TDD transmission.

8 Claims, 5 Drawing Sheets

TIME DIVISION MULTIPLE ACCESS FDD/TDD DUAL MODE RADIO AND A TIME DIVISION MULTIPLE ACCESS TDD DUAL BAND SYSTEM

BACKGROUND OF THE INVENTION

1. Field of the Invention

The present invention relates to a Time Division Multiple Access (hereinafter TDMA) system radio used for mobile communications or the like, and more specifically to a dual mode system which can use, in a single handset, both a frequency Division Duplex (hereinafter FDD) system which uses different frequencies for transmission and reception in the TDMA system and a Time Division Duplex (hereinafter TDD) system which time-shares transmission and reception, and also relates to a TDD dual band system which switches a plurality of frequency bands in the TDD system.

2. Related Art of the Invention

Recently, with an increasing demand for mobile communication services such as vessel phones, plane phones, and train phones as well as car phones, portable phones, and the personal handy phone system, various types of communication systems have been proposed. One such system is a TDMA system which makes a plurality of mobile stations share a radio wave of the same frequency from a base station by time sharing.

With reference to drawings, a conventional dual mode system will be described which is based on the TDMA system and integrally accommodates the TDD system and the FDD system into a single radio. With reference to FIG. 4 which is a block diagram illustrating the radio, the radio part of the FDD system will be described first.

At the time of reception, the mobile terminal 102a of the mode changeover switch 102 and the mobile terminal 103C of the transmission-reception changeover switch 103 are switched to the terminal 102b and the terminal 103R, respectively. The high-frequency signal which has entered from the antenna 101 for both the FDD and TDD systems passes the mobile terminal 102a of the mode changeover switch 102, the terminal 102b, the mobile terminal 103C of the transmission-reception changeover switch 103, and the terminal 103R, selects the reception frequencies of 810–826 MHz of its own station at the high-frequency band filter 104, is amplified by the high-frequency amplifier 105. Then the amplified high-frequency signal is mixed with the local oscillation frequencies of 680–696 MHz which have been inputted by the converter 106 from the local oscillation unit 107 so as to be converted into an intermediate frequency of 130 MHz, demodulated by the demodulation unit 108, and as a result, a reception output is obtained.

At the time of transmission, the mobile terminal 103C of the transmission-reception changeover switch 103 is connected to the terminal 103T side. The carrier frequency of 260 MHz is digital-modulated in the modulation signal generation unit 109 by a QAM modulation or another method so as to be converted into transmission frequencies of 940–956 MHz by using the frequencies of 680–696 MHz inputted from the local oscillation unit 107. After passing the band filter 110, the modulation signal is amplified by the high-frequency amplifiers 111 and 112, passes the band filter 113, the terminal 103T of the transmission-reception changeover switch 103, the mobile terminal 103C, the terminal 102b of the mode changeover switch 102, and the mobile terminal 102a, thereby being transmitted from the antenna 101.

The following is a description of the radio part of the TDD system. In FIG. 4 at the time of reception, the mobile terminal 102a of the mode changeover switch 102 and the mobile terminal 115C of the transmission-reception changeover switch 115 are connected to the terminal 102c and the terminal 115R, respectively. The high-frequency signal which has entered from the antenna 101 goes from the mobile terminal 102a of the mode changeover switch 102 to the terminal 102c, selects the transmission-reception frequencies of 1895.15–1917.95 MHz of its own station at the band filter 114, goes from the mobile terminal 115C of the transmission-reception changeover switch 115 to the terminal 115R, is amplified by the high-frequency amplifier 116, mixed with the local oscillation frequencies of 1635.15–1657.95 MHz which have been inputted by the converter 117 from the local oscillation unit 118 so as to be converted into an intermediate frequency of 260 MHz, demodulated by the demodulation unit 119, and as a result, a reception output is obtained.

At the time of transmission, the mobile terminal 115C of the transmission-reception changeover switch 115 is connected to the terminal 115T. The carrier frequency of 260 MHz is digital-modulated in the modulation signal generation unit 120 and converted into transmission frequencies of 1895.15–1917.95 MHz by using the frequencies of 1635.15–1657.95 MHz inputted from the local oscillation unit 118. After passing the band filter 121, the modulation signal is amplified by the high-frequency amplifier 122, passes the terminal 115T of the transmission-reception changeover switch 115, the mobile terminal 115C, the band filter 114, the terminal 102c of the mode changeover switch 102, and the mobile terminal 102a, thereby being transmitted from the antenna 101.

When the FDD mode is used, the control unit 114 so controls the mode changeover switch 102, transmission-reception changeover switch 103, local oscillation unit 107, demodulation unit 108, and modulation signal generation unit 109 that these operate in harmony with the above-mentioned frequency relationship in response to the transmission and reception. In the same manner, when the TDD mode is used, the control unit 114 so controls the mode changeover switch 102, transmission-reception changeover switch 115, local oscillation unit 118, demodulation unit 119, and modulation signal generation unit 120 that these operate in harmony with the above-mentioned frequency relationship in response to the transmission and reception.

Reception and transmission are time-shared by switching the transmission-reception changeover switch 103 in the FDD mode and the transmission-reception changeover switch 115 in the TDD mode at a much shorter frequency than an audio signal so as to perform transmission and reception at the same time.

The following is a description of a conventional TDD system dual band radio which is based on the TDMA system and can be used with two frequency bands. With reference to FIG. 5 which is a block diagram of the radio, the first frequency radio part will be described.

At the reception by the first frequency, the mobile terminal 132a of the band changeover switch 132 and the mobile terminal 134C of the transmission-reception changeover switch 134 are connected to the terminals 132b and 134R, respectively. The high-frequency signal which has entered from the antenna 131 goes from the mobile terminal 132a of the band changeover switch 132 to the terminal 132b, selects the transmission-reception frequencies of 940–956 MHz of its own station in the band filter 133, goes from the mobile terminal 134C of the transmission-reception changeover switch 134 to the terminal 134R, is amplified by the high-frequency amplifier 135, mixed with the local oscillation frequencies of 680–696 MHz which have been inputted by the converter 136 from the local oscillation unit 137 so as to be converted into an intermediate frequency of 260 MHz, demodulated by the demodulation unit 138, and as a result a reception output is obtained.

At the time of transmission, the mobile terminal 134C of the transmission-reception changeover switch 134 is connected to the terminal 134T side. The carrier frequency of 260 MHz is digital-modulated in the modulation signal generation unit 140 and converted into transmission frequencies of 940–956 MHz by using the frequencies of 680–696 MHz inputted from the local oscillation unit 137. After passing the band filter 141, the modulation signal is amplified by the high-frequency amplifier 142, passes the terminal 134T of the transmission-reception changeover switch 134, the mobile terminal 134C, the band filter 133, the terminal 132b of the band changeover switch 132, and the mobile terminal 132a, thereby being transmitted from the antenna 131.

The following is a description of the second frequency radio part. In FIG. 5 at the time of reception, the mobile terminal 132a of the band changeover switch 132 and the mobile terminal 144C of the transmission-reception changeover switch 144 are connected to the terminal 132c and the terminal 144R, respectively. The high-frequency signal which has entered from the antenna 131 goes from the mobile terminal 132a of the band changeover switch 132 to the terminal 132c, selects the transmission-reception frequencies of 1895.15–1917.95 MHz of its own station at a band filter 143, goes from the mobile terminal 144c of the transmission-reception changeover switch 144 to the terminal 144R, is amplified by the high-frequency amplifier 145, mixed with the local oscillation frequencies of 1635.15–1657.95 MHz which have been inputted by the converter 146 from the local oscillation unit 147 so as to be converted into an intermediate frequency of 260 MHz, demodulated by the demodulation unit 148, and as a result, a reception output is obtained.

At the time of transmission, the mobile terminal 144C of the transmission-reception changeover switch 144 is connected to the terminal 144T. The carrier frequency of 260 MHz is digital-modulated in the modulation signal generation unit 150 and converted into transmission frequencies of 1895.15–1917.95 MHz by using the frequencies of 1635.15–1657.95 MHz inputted from the local oscillation unit 147. After passing the band filter 151, the modulation signal is amplified by the high-frequency amplifier 152, passes the terminal 144T of the transmission-reception changeover switch 144, the mobile terminal 144C, the band filter 143, the terminal 132c of the band changeover switch 132, and the mobile terminal 132a, thereby being transmitted from the antenna 131.

When the first frequency is used, the control unit 139 so controls the band changeover switch 132, transmission-reception changeover switch 134, local oscillation unit 137, demodulation unit 138, and modulation signal generation unit 140 that these operate in harmony with the above-mentioned frequency relationship in response to the transmission and reception. In the same manner, when the second frequency is used, the control unit 139 so controls the band changeover switch 132, transmission-reception changeover switch 144, local oscillation unit 147, demodulation unit 148, and modulation signal generation unit 150 that these operate in harmony with the above-mentioned frequency relationship in response to the transmission and reception.

Reception and transmission are time-shared by switching the transmission-reception changeover switch 134 at the first frequency and the transmission-reception changeover switch 144 at the second frequency at a much shorter frequency than an audio signal so as to perform the transmission and reception at the same time.

In the FDD/TDD dual mode system shown in FIG. 4 the radio part of the FDD system comprises a transmission system and a reception system on the right side of the transmission-reception changeover switch 103, and in the same manner the radio part of the TDD system comprises a transmission system and a reception system on the right side of the transmission-reception changeover switch 115. Such a dual mode not only increases the production cost due to the complicated circuit structure, the increased number of components, and the time and labor of assembling but also prevents the miniaturization.

The TDD system dual band radio shown in FIG. 5 has the same problems, so that the simplification of the circuit structure has been demanded by sharing a circuit.

SUMMARY OF THE INVENTION

The present invention has an object of improving the problems of the above-mentioned conventional examples and providing a TDMA FDD/TDD dual mode system and a TDMA TDD dual band system whose circuit structure has been simplified by sharing as many the circuit components as possible by using a matrix switch.

A Time Division Multiple Access FDD/TDD dual mode system according to a first embodiment comprises;

a switch including first and second common terminals and first and second terminals, said first and second common terminals are connected to said first and second terminals exclusively from each other;

a TDD demodulation means including a demodulation unit and demodulating a TDD receiving signal from the first common terminal of said switch after converting said TDD receiving signal into an intermediate frequency;

an FDD/TDD transmission modulation signal generation means for modulating a carrier by a transmission signal and impressing the signal which has been converted into a transmission frequency on the second common terminal of said switch;

an FDD transmission band selection means having at least a band selection means which is connected to the first terminal of said switch;

a TDD transmission-reception band selection means having at least a band selection means which is connected to the second terminal of said switch; and an FDD demodulation means having a demodulation unit and converting an FDD reception signal into an intermediate frequency and then demodulating the signal;

said Time Division Multiple Access FDD/TDD dual mode system being characterized in that the first common terminal of said switch is connected to the second terminal at the TDD reception whereas the second common terminal is connected to the first terminal at the FDD transmission, and to the second terminal at the TDD transmission.

Thus, the circuit structure can be simplified by combining the circuit parts which are divided in accordance with the switching between the FDD mode and TDD mode, and the switching between transmission and reception.

The Time Division Multiple Access FDD/TDD dual mode system according to the first embodiment is in that the demodulation unit of said TDD demodulation means and the demodulation unit of said FDD demodulation means are the same, and the demodulation unit has two inputs for a TDD signal which has been converted into said intermediate frequency and an FDD signal which has been converted into said intermediate frequency.

Consequently, the circuit structure can be simplified by sharing the demodulation unit of the TDD demodulation means at the reception of the FDD mode.

A Time Division Multiple Access TDD dual band system according to a second embodiment comprises:

- a switch including first, second, and third common terminals and first and second terminals, said first, second, and third common terminals are connected to said first and second terminals exclusively from each other;
- a first demodulation means including a demodulation unit and demodulating a first frequency reception signal from the first common terminal of said switch after converting said reception signal into an intermediate frequency;
- a second demodulation means including a demodulation unit and demodulating a second frequency reception signal from the second common terminal of said switch after converting said reception signal into an intermediate frequency;
- a transmission modulation signal generation means for modulating a carrier signal by a transmission signal and impressing a signal which has been converted into the first transmission frequency or the second transmission frequency on the third common terminal of said switch;
- a first frequency transmission-reception band selection means having at least a band selection means which is connected to the first terminal of said switch;
- a second frequency transmission-reception band selection means having at least a band selection means which is connected to the second terminal of said switch; and
- said Time Division Multiple Access TDD dual band system being characterized in that the first common terminal of said switch is connected to the first terminal at the first frequency reception, the second common terminal of said switch is connected to the second terminal at the second frequency reception, and the third common terminal of said switch is connected to the first terminal at the first frequency transmission, and connected to the second terminal at the second frequency transmission.

Thus, the circuit structure can be simplified by combining the circuit parts which are divided in accordance with the switching between the first frequency and the second frequency, and the switching between transmission and reception.

A Time Division Multiple Access TDD dual band system according to a third embodiment comprises:

- a switch including first and second common terminals and first and second terminals, said first and second common terminals are connected to said first and second terminals exclusively from each other;
- a demodulation means including a demodulation unit and demodulating a first frequency reception signal or a second frequency reception signal from the first common terminal of said switch after converting said reception signal into an intermediate frequency;
- a transmission modulation signal generation means for modulating a carrier signal by a transmission signal and impressing a signal which has been converted into a first transmission frequency or a second transmission frequency on the second common terminal of said switch;

- a first frequency transmission-reception band selection means having at least a band selection means which is connected to the first terminal of said switch;
- a second frequency transmission-reception band selection means having at least a band selection means which is connected to the second terminal of said switch; and
- said Time Division Multiple Access TDD dual band system being characterized in that the first common terminal of said switch is connected to the first terminal at the first frequency reception and to the second terminal at the second frequency reception, whereas the second common terminal of said switch is connected to the first terminal at the first frequency transmission and to the second terminal at the second frequency transmission.

Thus, the circuit structure can be simplified by combining the circuit parts which are divided in accordance with the switching between the first frequency and the second frequency, and the switching between transmission and reception.

Thus, in order to solve these problems, a TDMA FDD/TDD dual mode system and a TDMA TDD dual band system in accordance of the present invention combine divided circuit components by operating a matrix switch at the switching between the transmission and reception modes and between transmission and reception, and by using a specified mode and a special circuit for a specified frequency, so as to simplify the circuit structure, thereby achieving the miniaturization and low cost.

Figure 1:
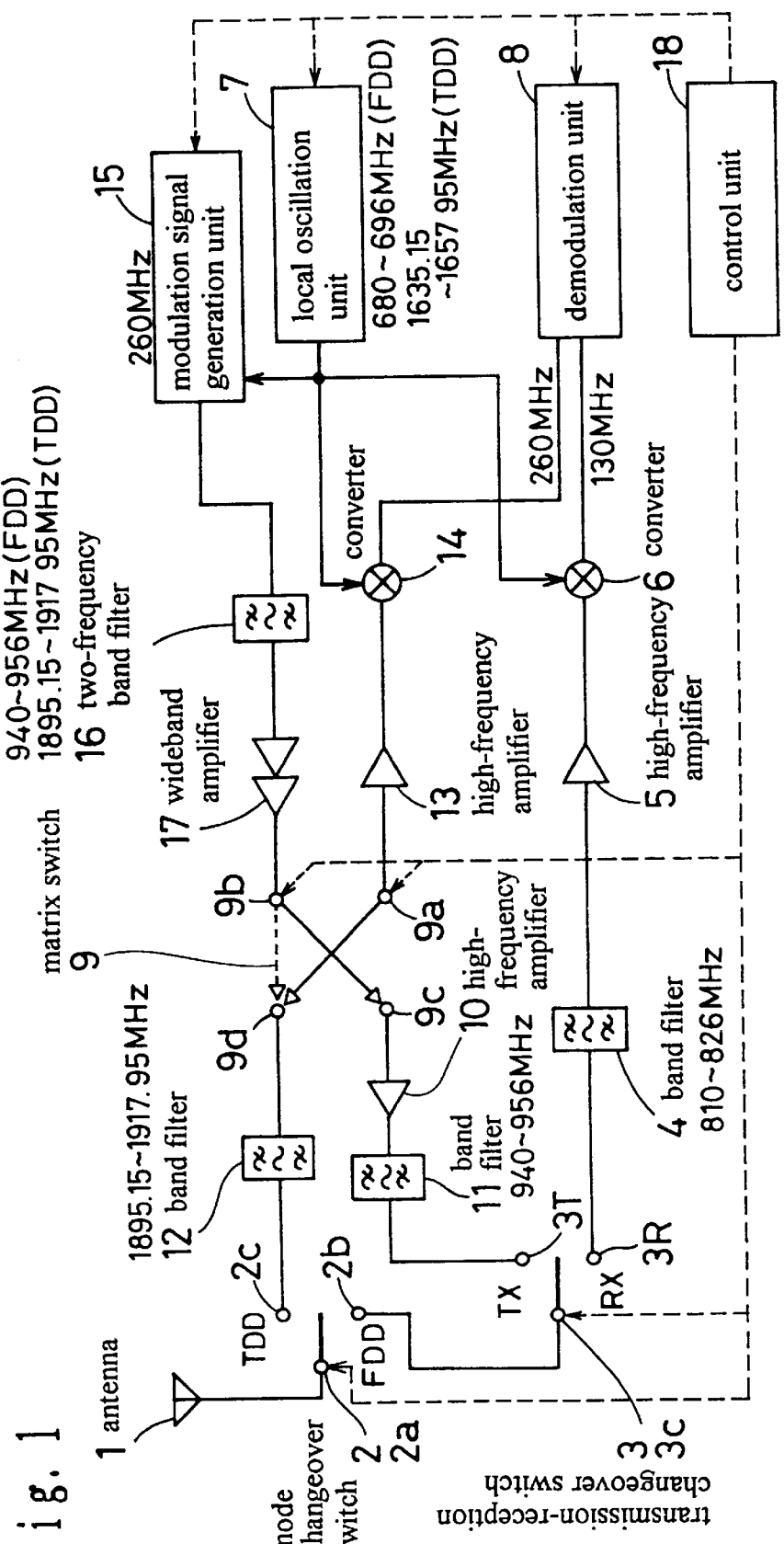
FIG. 1 is a block diagram illustrating a TDMA FDD/TDD dual mode system in accordance with the first embodiment of the present invention.

REFERENCE NUMBERS 1 antenna
2 mode changeover switch
3 transmission-reception changeover switch
4, 11, 12 band filters
5, 10, 13 high-frequency amplifiers
6, 14 converters
7 local oscillation unit
8 demodulation unit
9 matrix switch
15 modulation signal generation unit
16 two-frequency band filter
17 wideband amplifier
18 control unit

PREFERRED EMBODIMENTS OF THE INVENTION (Embodiment 1)

FIG. 1 is a block diagram illustrating a TDMA FDD/TDD dual mode system in accordance with the first embodiment of the present invention. In FIG. 1 in the FDD reception unit the antenna 1 for transmission and reception is connected to the mobile terminal 2a of the mode changeover switch 2, the terminal 2b of the mode changeover switch 2 is connected to the mobile terminal 3C of the transmission-reception changeover switch 3, and the terminal 3R of the transmission-reception changeover switch 3 is connected to the input of the high-frequency amplifier 5 via the high-frequency band filter 4. The output of the high-frequency amplifier 5 is connected to one of the inputs of the converter 6, the other input of the converter 6 is connected with the output of the local oscillation unit 7, and the output of the converter 6 is connected to one of the inputs of the demodulation unit 8. The function from the band filter 4 to the demodulation unit 8 is defined as an FDD demodulation means.

The FDD transmission band selection means is composed of a high-frequency amplifier 10 and a band filter 11. The terminal 9c of the two-terminal vs. two-common-terminal matrix switch 9 is connected to the input of the high-frequency amplifier 10, the output of the high-frequency amplifier 10 is connected with the band filter 11, and the band filter 11 is connected to the terminal 3T of the transmission-reception changeover switch 3. The two-terminal vs. two-common-terminal matrix switch 9 has the first and second common terminals 9a and 9b and the first and second terminals 9c and 9d, and the first and second common terminals 9a and 9b are not connected to one of the first terminal 9c or the second terminal 9d at the same time, in other words, they are connected in an exclusive manner.

The TDD transmission-reception band selection means is composed of the band filter 12, and the terminal 2c of the mode changeover switch is connected to the terminal 9d of the two-terminal vs. two-common-terminal matrix switch 9 via the high-frequency band filter 12 for transmission and reception.

The first common terminal 9a of the two-terminal vs. two-common-terminal matrix switch 9 is connected to the input of the high-frequency amplifier 13 for reception, the output of the high-frequency amplifier for reception 13 is connected to one of the inputs of the converter 14, and the other input of the converter 14 is connected with the output of the local oscillation unit 7. The output of the converter 14 is connected to the other input of the demodulation unit 8 and the demodulation unit 8 is shared by the FDD, too. The function from the high-frequency amplifier 13 to the demodulation unit 8 is defined as a TDD demodulation means.

As the common transmission unit for FDD and TDD, the modulation signal generation unit 15 receives the output of the local oscillation unit 7, the output of the modulation signal generation unit 15 is connected to the input of the wideband amplifier 17 via the two-frequency band filter 16, and the output of the wideband amplifier 17 is connected to the common terminal 9b of the two-terminal vs. two-common-terminal matrix switch 9. The function of this part is defined as a FDD/TDD transmission modulation signal generation means.

The control unit 18 controls the mode changeover switch 2, transmission-reception changeover switch 3, local oscillation unit 7, demodulation unit 8, two-terminal vs. two-common-terminals matrix witch 9, modulation signal generation unit 15, and the whole operation of the system.

The operation in accordance with the first embodiment having the above-described construction will be described. With regard to the communication in the FDD mode, the control unit 18 connects the mobile terminal 2a of the mode changeover switch 2 with the terminal 2b, and at the time of reception, the mobile terminal 3C of the transmission-reception changeover switch 3 is connected to the terminal 3R. Consequently, the high-frequency signal which has entered from the antenna 1 goes from the mobile terminal 2a of the mode changeover switch 2 to the terminal 3R by way of the terminal 2b and the mobile terminal 3C of the transmission-reception changeover switch 3, selects the reception frequencies of 810–826 MHz of its own station at the band filter 4 for reception so as to input it to the high-frequency amplifier 5, and is amplified there. After this, the amplified high-frequency signal is mixed with the local oscillation frequencies of 680–696 MHz which have been inputted by the converter 6 from the local oscillation unit 7 so as to be converted into an intermediate frequency of 130 MHz, demodulated by the demodulation unit 8, and as a result, a reception output is obtained.

At the time of transmission, the control unit 18 connects the mobile terminal 3C of the transmission-reception changeover switch 3 to the terminal 3T, and also connects the second common terminal 9b of the two-terminal vs. two-common-terminal matrix switch 9 to the first terminal 9c. Therefore, the modulation signal generation unit 15 digital-modulates the carrier frequency of 260 MHz by the QAM modulation or another method and converts the frequency into transmission frequencies of 940–956 MHz by using the frequencies of 680–696 MHz inputted from the local oscillation unit 7. The modulation signal passes the two-frequency band filter 16, which passes 940–956 MHz and 1895.15–1917.95 MHz, is amplified by the wideband amplifier 17, which can amplify the above-mentioned frequency bands, goes from the second common terminal 9b of the two-terminal vs. two-common-terminal matrix switch 9 to the first terminal 9C, is amplified by the high-frequency amplifier 10, passes the band filter 11, which passes 940–956 MHz, further passes the terminal 3T of the transmission-reception changeover switch 3, the mobile terminal 3C, the terminal 2b of the mode changeover switch 2, and the mobile terminal 2a, thereby being transmitted from the antenna 1.

At the communication in the FDD mode, the control unit 18 so controls the mode changeover switch 2, transmission-reception changeover switch 3, local oscillation unit 7, demodulation unit 8, two-terminal vs. two-common-terminal matrix switch 9, and modulation signal generation unit 15 that these operate in harmony with the above-mentioned frequency relationship in response to the transmission and reception.

With regard to the communication in the TDD mode, at the time of reception the control unit 18 connects the mobile terminal 2a of the mode changeover switch 2 with the terminal 2c and the first common terminal 9a of the two-terminal vs. two-common-terminal matrix switch 9 is connected to the second terminal 9d. Consequently, the high-frequency signal which has entered from the antenna 1 passes the terminals 2a and 2c of the mode changeover switch 2, selects the transmission-reception frequencies of 1895.15–1917.95 MHz of its own station at the band filter 12, goes from the second terminal 9d of the two-terminal vs. two-common-terminal matrix switch 9 to the first common terminal 9a, is amplified by the high-frequency amplifier 13, mixed with the local oscillation frequencies of 1635.15–1657.95 MHz which have been inputted by the converter 14 from the local oscillation unit 7 so as to be converted into an intermediate frequency of 260 MHz, demodulated by the demodulation unit 8, and as a result, a reception output is obtained.

At the time of transmission, the control unit 18 connects the second common terminal 9b of the two-terminal vs. two-common-terminal matrix switch 9 with the second terminal 9d, and also connects the mobile terminal 2a of the mode changeover switch 2 to the terminal 2c. Therefore, the modulation signal generation unit 15 digital-modulates the generated carrier frequency of 260 MHz so as to convert the frequency into transmission frequencies of 1895.15–1917.95 MHz by using the frequencies of 1635.15–1657.95 MHz inputted from the local oscillation unit 7. The modulation signal passes the two-frequency band filter 16, is amplified by the wideband amplifier 17, passes the second common terminal 9b of the two-terminal vs. two-common-terminal matrix switch 9, the second terminal 9d, the band filter 12 for passing the frequencies of 1895.15–1917.95 MHz, the terminal 2c of the mode changeover switch 2, and the mobile terminal 2a, thereby being transmitted from the antenna 1.

At the communication in the TDD mode, the control unit 18 so controls the mode changeover switch 2, local oscillation unit 7, demodulation unit 8, two-terminal vs. two-common-terminal matrix switch 9, and modulation signal generation unit 15 that these operate in harmony with the above-mentioned frequency relationship in response to the transmission and reception.

Reception and transmission are time-shared by switching the transmission-reception changeover switch 3 and the two-terminal vs. two-common-terminal matrix switch 9 at the FDD mode and the two-terminal vs. two-common-terminal matrix switch 9 in the TDD mode at a much shorter frequency than an audio signal so as to perform the transmission and reception at the same time.

In the present embodiment it is possible to demodulate the intermediate frequency of 130 MHz or 260 MHz after converting it into a much lower frequency in the demodulation unit 8.

In addition, the demodulation unit 8, which is shared by the FDD mode and the TDD mode, may be provided for each mode.

(Embodiment 2)

Figure 2:
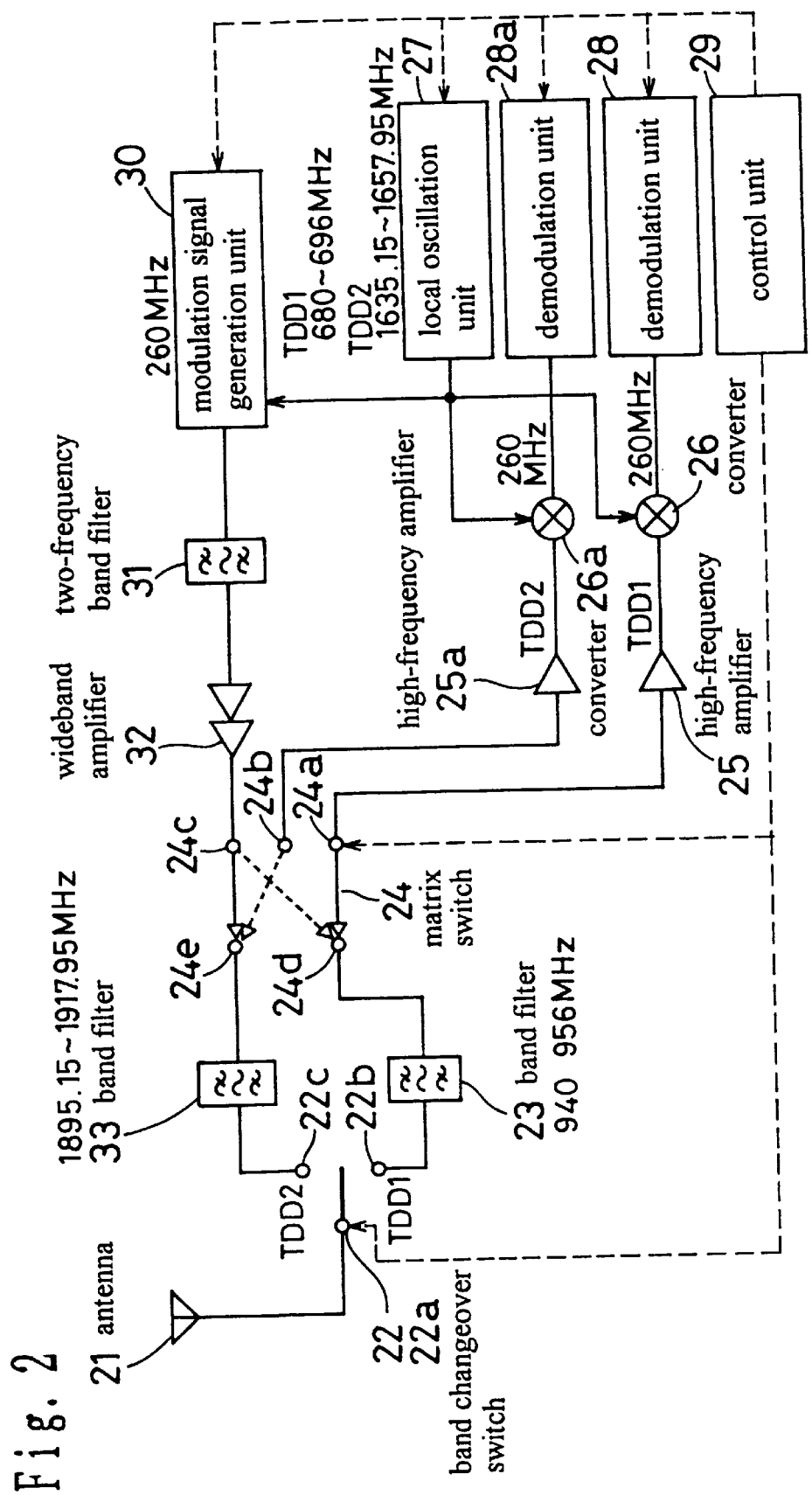
FIG. 2 is a block diagram illustrating a TDMA TDD dual band system in accordance with the second embodiment of the present invention.

The following is a description of a TDD dual band system which is based on the TDMA and can communicate in two frequency bands. FIG. 2 shows a block diagram illustrating a TDMA TDD dual band system in accordance with the second embodiment of the present invention. In FIG. 2 the first frequency transmission-reception band selection means is composed of the band filter 23, the antenna 21 is connected to the mobile terminal 22a of the band changeover switch 22, and the terminal 22b of the band changeover switch 22 is connected to the terminal 24d of the two-terminal vs. three-common-terminal matrix switch 24 via the band filter 23 for passing the first frequency. The second frequency transmission-reception band selection means is composed of the band filter 33, the terminal 22c of the band changeover switch 22 is connected to the terminal 24e of the two-terminal vs. three-common-terminal matrix switch 24 via the band filter 33 for passing the second frequency. The two-terminal vs. three-common-terminal matrix switch 24 includes first, second, and third common terminals 24a, 24b, and 24c and first and second terminals 24d and 24e. The first, second, and third common terminals 24a, 24b, and 24c are never connected to one of the first and second terminals 24d and 24e at the same time, in other words, they are connected exclusively.

In the first frequency reception unit the first common terminal 24a of the two-terminal vs. three-common-terminal matrix switch 24 is connected to the input of the high-frequency amplifier 25, and the output of the high frequency amplifier 25 is connected to one of the inputs of the converter 26. The other input of the converter 26 is connected with the output of the local oscillation unit 27, and the output of the converter 26 is connected to the input of the demodulation unit 28. The function from the high-frequency amplifier 25 to the demodulation unit 28 is defined as a first demodulation means.

In the second frequency reception unit the second common terminal 24b of the two-terminal vs. three-common-terminal matrix switch 24 is connected to the input of the high-frequency amplifier 25a, and the output of the high frequency amplifier 25a is connected to one of the inputs of the converter 26a. The other input of the converter 26a is connected with the output of the local oscillation unit 27, and the output of the converter 26a is connected to the input of the demodulation unit 28a. The function from the high-frequency amplifier 25a to the demodulation unit 28a is defined as a second demodulation means.

In the transmission unit used for both the first and second frequencies, the output of the modulation signal generation unit 30 is connected to the input of the wideband amplifier 32 via the two-frequency band filter 31, and the output of the wideband amplifier 32 is connected to the third common terminal 24c of the two-terminal vs. three-common-terminal matrix switch 24. The modulation signal generation unit 30 is connected with the output of the local oscillation unit 27. The function of this part is defined as a transmission modulation signal generation means.

The control unit 29 control the band changeover switch 22, the two-terminal vs. three-common-terminal matrix switch 24, the local oscillation unit 27, the demodulation units 28 and 28a, the modulation signal generation unit 30, and the entire operation of the system.

The operation in accordance with the second embodiment having the above-described construction will be described. The reception by the first frequency will be described. At the reception by the first frequency, the mobile terminal 22a of the band changeover switch 22 is connected to the terminal 22b, and the first common terminal 24a of the two-terminal vs. three-common-terminal matrix switch 24 is connected to the first terminal 24d. Consequently, the high-frequency signal which has entered from the antenna 21 passes from the mobile terminal 22a of the band changeover switch 22 to the terminal 22b, selects the transmission-reception frequencies of 940–956 MHz of its own station at the band filter 23, goes from the first terminal 24d of the two-terminal vs. three-common-terminal matrix switch 24 to the first common terminal 24a, and is amplified by the high-frequency amplifier 25, mixed with the local oscillation frequencies of 680–696 MHz which have been inputted by the converter 26 from the local oscillation unit 27 so as to be converted into an intermediate frequency of 260 MHz, inputted to the demodulator 28 so as to be demodulated there, and as a result, a reception output is obtained.

Reception by the second frequency will be described. In this case, the mobile terminal 22a of the band changeover switch 22 is connected to the terminal 22c, and the second common terminal 24b of the two-terminal vs. three-common-terminal matrix switch 24 is connected to the second terminal 24e. Consequently, the high-frequency signal which has entered from the antenna 21 goes from the mobile terminal 22a of the band changeover switch 22 to the terminal 22c, selects the transmission-reception frequencies of 1895.15–1917.95 MHz of its own station at the band filter 33, goes from the second terminal 24e of the two-terminal vs. three-common-terminal matrix switch 24 to the second common terminal 24b, and is amplified by the high-frequency amplifier 25a, then mixed with the local oscillation frequencies of 1635.15–1657.95 MHz which have been inputted by the converter 26a from the local oscillation unit 27 so as to be converted into an intermediate frequency of 260 MHz, inputted to the demodulation unit 28a so as to be demodulated there, and as a result, a reception output is obtained.

At the time of the transmission of the first frequency, the mobile terminal 22a of the band changeover switch 22 is connected to the terminal 22b, and the third common terminal 24c of the two-terminal vs. three-common-terminal matrix switch 24 is connected to the first terminal 24d. The carrier frequency of 260 MHz is digital-modulated in the modulation signal generation unit 30 and converted into transmission frequencies of 940–956 MHz by using the frequencies of 680–696 MHz inputted from the local oscillation unit 27. After passing the two-frequency band filter 31 for passing 940–956 MHz and 1895.15–1917.95, the modulation signal is amplified by the wideband amplifier 32, passes the third common terminal 24c of the two-terminal vs. three-common-terminal matrix switch 24, the first terminal 24d, the band filter 23, the terminal 22b of the band changeover switch 22, and the mobile terminal 22a, thereby being transmitted from the antenna 21.

At the time of the transmission of the second frequency, the mobile terminal 22a of the band changeover switch 22 is connected to the terminal 22c, and the third common terminal 24c of the two-terminal vs. three-common-terminal matrix switch 24 is connected to the second terminal 24e. The carrier frequency of 260 MHz is digital-modulated in the modulation signal generation unit 30 and converted into transmission frequencies of 1895.15–1917.95 MHz by using the frequencies of 1635.15–1657.95 MHz inputted from the local oscillation unit 27. After passing the two-frequency band filter 31, the modulation signal is amplified by the wideband amplifier 32, passes the third common terminal 24c of the two-terminal vs. three-common-terminal matrix switch 24, the second terminal 24e, the band filter 33, the terminal 22c of the band changeover switch 22, and the mobile terminal 22a, thereby being transmitted from the antenna 21.

When the first frequency is used, the control unit 29 so controls the band changeover switch 22, two-terminal vs. three-common-terminal matrix switch 24, local oscillation unit 27, demodulation unit 28, and modulation signal generation unit 30 that these operate in harmony with the above-mentioned frequency relationship in response to the transmission and reception. In the same manner, when the second frequency is used, the control unit 29 so controls the demodulation unit 28a in place of the demodulation unit 28 and each unit mentioned above that these operate in harmony with the above-mentioned frequency relationship in response to the transmission and reception.

Reception and transmission are time-shared by switching the two-terminal vs. three-common-terminal matrix switch 24 at a much shorter frequency than an audio signal so as to perform the transmission and reception at the same time.

In the present embodiment, too, it is possible to demodulate the intermediate frequency of 260 MHz after converting it into a much lower frequency in the demodulation unit 28 or 28a.

(Embodiment 3)

Figure 3:
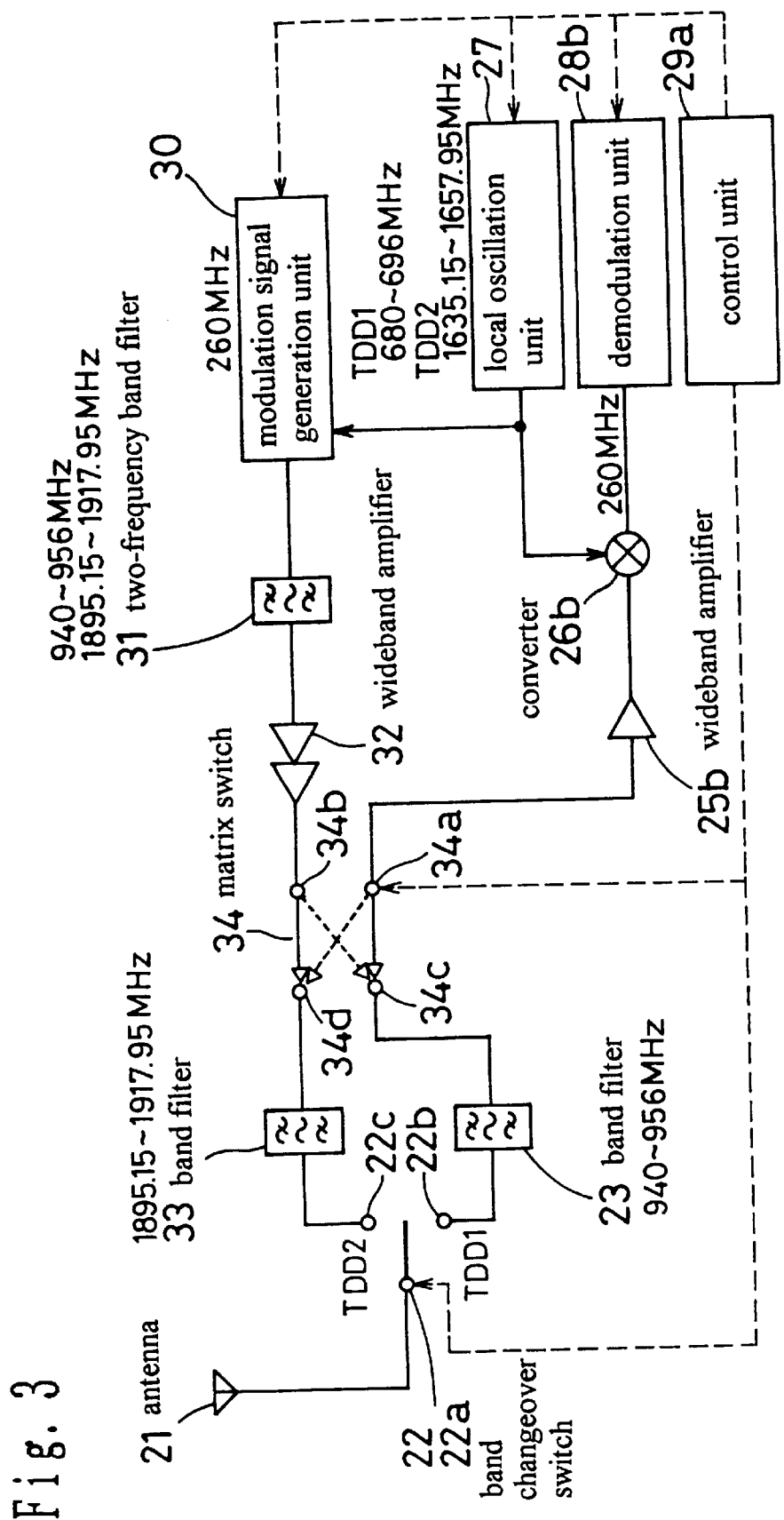
FIG. 3 is a block diagram illustrating a TDMA TDD dual band system in accordance with the third embodiment of the present invention.
Figure 4:
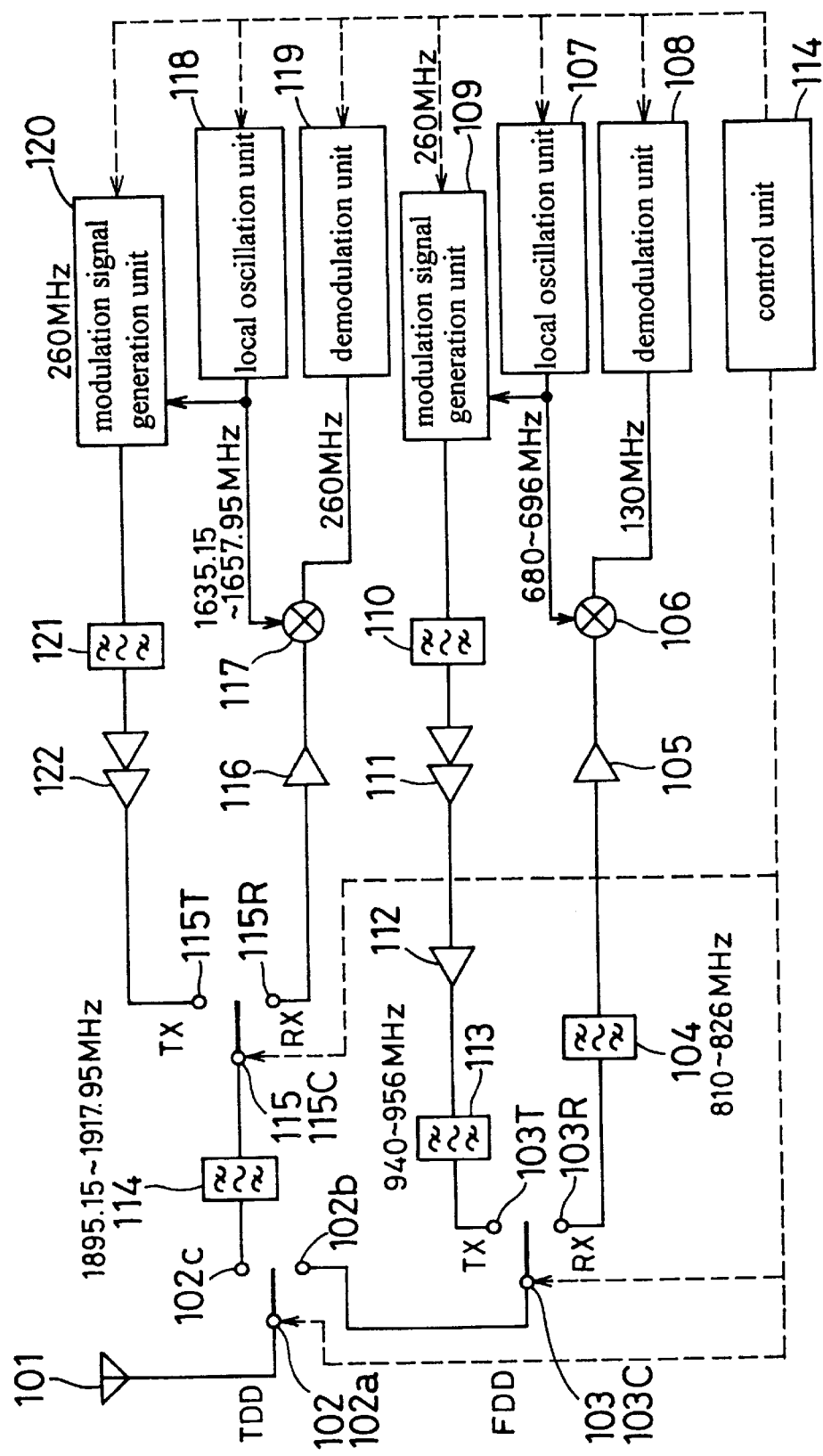
FIG. 4 is a block diagram illustrating a TDMA FDD/TDD dual mode system in accordance with a prior art.
Figure 5:
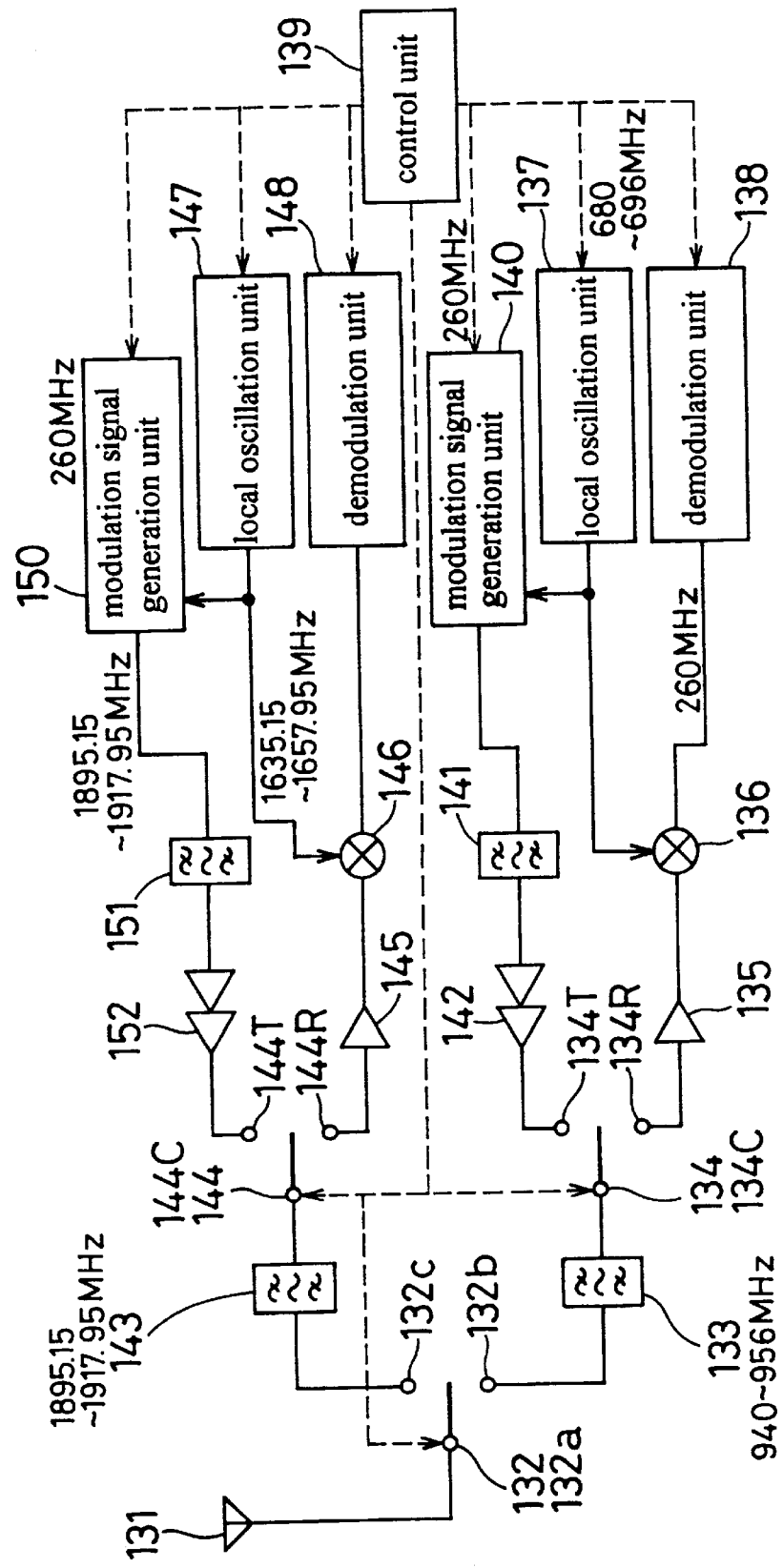
FIG. 5 is a block diagram illustrating a TDMA TDD dual band system in accordance with a prior art.

The following is a description of a further simplified TDD dual band system which is based on the TDMA system and can communicate by using two frequency bands in accordance with the third embodiment. FIG. 3 is a block diagram illustrating the TDMA TDD dual band system in accordance with the third embodiment of the present invention. In FIG. 3 the components having the same functions as those shown in FIG. 2 are assigned the same reference numbers and the description will be omitted. The band filter 23 which composes the first frequency transmission-reception band selection means is connected to the first terminal 34c of the two-terminal vs. two-common-terminal matrix switch 34. The band filter 33 which composes the second frequency transmission-reception band selection means is connected to the second terminal 34d of the two-terminal vs. two-common-terminal matrix switch 34. The first common terminal 34a and the second common terminal 34b of the two-terminal vs. three-common-terminal matrix switch 34 are also connected exclusively in the same manner as those in the first and second embodiments.

In the reception unit shared by the first and second frequency bands, the first common terminal 34a of the two-terminal vs. two-common-terminal matrix switch 34 is connected to the input of the wideband amplifier 25b, and the output of the wideband amplifier 25b is connected to one of the inputs of the converter 26b. The other input of the converter 26b is connected with the output of the local oscillation unit 27, and the output of the converter 26b is connected to the input of the demodulation unit 28b. The function from the high-frequency amplifier 25b to the demodulation unit 28b is defined as a demodulation means. The wideband amplifier 25b can amplify both the first and second frequencies.

In the transmission unit used for both the first and second frequencies, the output of the wideband amplifier 32 is connected to the second common terminal 34b of the two-terminal vs. two-common-terminal matrix switch 34. The function from the modulation signal generation unit 30 to the wideband amplifier 32 is defined as a transmission modulation signal generation means.

The control unit 29a controls the band changeover switch 22, local oscillation unit 27, demodulation unit 28b, modulation signal generation unit 30, two-terminal vs. two-common-terminal matrix switch 34, and the entire operation of the radio.

The operation in accordance with the third embodiment having the above-described construction will be described. At the reception by the first frequency, the mobile terminal 22a of the band changeover switch 22 is connected to the terminal 22b, and the first common terminal 34a of the two-terminal vs. two-common-terminal matrix switch 34 is connected to the first terminal 34c. Consequently, the high-frequency signal which has entered from the antenna 21 passes from the mobile terminal 22a of the band changeover switch 22 to the terminal 22b, selects the transmission-reception frequencies of 940–956 MHz of its own station at the band filter 23, goes from the first terminal 34c of the two-terminal vs. two-common-terminal matrix switch 34 to the first common terminal 34a, is amplified by the wideband amplifier 25b, mixed with the local oscillation frequencies of 680–696 MHz which have been inputted by the converter 26b from the local oscillation unit 27 so as to be converted into an intermediate frequency of 260 MHz, inputted to the demodulator 28b so as to be demodulated there, and as a result, a reception output is obtained.

At the reception by the second frequency, the mobile terminal 22a of the band changeover switch 22 is connected to the terminal 22c, and the first common terminal 34a of the two-terminal vs. two-common-terminal matrix switch 34 is connected to the second terminal 34d. Consequently, the high-frequency signal which has entered from the antenna 21 goes from the mobile terminal 22a of the band changeover switch 22 to the terminal 22c, selects the transmission-reception frequencies of 1895.15–1917.95 MHz of its own station at the band filter 33, goes from the second terminal 34d of the two-terminal vs. two-common-terminal matrix switch 34 to the first common terminal 34a, and is amplified by the wideband amplifier 25b, mixed with the local oscillation frequencies of 1635.15–1657.95 MHz which have been inputted by the converter 26b from the local oscillation unit 27 which is switched by the control unit 29a so as to be converted into an intermediate frequency of 260 MHz, inputted to the demodulation unit 28b so as to be demodulated there, and as a result, a reception output is obtained.

At the time of the transmission of the first frequency, the second common terminal 34b of the two-terminal vs. two-common-terminal matrix switch 34 is connected to the first terminal 34c, and the first terminal 34c is connected to the band filter 23, whereas at the time of the transmission of the second frequency, the second common terminal 34b of the two-terminal vs. two-common-terminal matrix switch 34 is connected to the second terminal 34d, and the second terminal 34d is connected to the band filter 33. The other points are the same as those shown in FIG. 2 of the second embodiment, so that the description of the operations is omitted.

When either the first frequency or the second frequency is used, the control unit 29a so controls the band changeover switch 22, two-terminal vs. two-common-terminal matrix switch 34, local oscillation unit 27, demodulation unit 28b, and modulation signal generation unit 30 that these operate in harmony with the above-mentioned frequency relationship in response to the transmission and reception. Reception and transmission are time-shared by switching the two-terminal vs. two-common-terminal matrix switch 34 at a much shorter frequency than an audio signal so as to perform the transmission and reception at the same time.

In each embodiment, it goes without saying that the transmission/reception frequencies, the values of frequencies set at each unit of the circuit, the number of amplification steps, the number, position of the filters, modulation system of the filters can be changed, if necessary. For example, when a larger output is needed, an additional high output power amplifier may be provided after the high frequency power amplifier. The high-frequency band path filters at the power amplifier side my be replaced by low path filters. Each technique shown in each of the embodiments can be performed separately, or in combination. The detailed parts of the circuit structure may be modified within the scope of the basic idea of the present invention.

As described above, according to the present invention, there is an advantageous effect that a TDMA FDD/TDD dual mode system and a TDMA TDD dual band system combine divided circuit components by operating a matrix switch at the switching between the transmission and reception modes and between transmission and reception, and by using a specified mode and a special circuit for a specified frequency band so as to share the circuit components to simplify the circuit structure, thereby achieving the miniaturization and low cost.

What is claimed is:

1. A Time Division Multiple Access FDD/TDD dual mode system comprising:
   a switch including first and second common terminals and first and second terminals, said first and second common terminals are connected to said first and second terminals exclusively from each other;
   a TDD demodulation means including a demodulation unit and demodulating a TDD receiving signal from the first common terminal of said switch after converting said TDD receiving signal into an intermediate frequency;
   an FDD/TDD transmission modulation signal generation means for modulating a carrier by a transmission signal and impressing the signal which has been converted into a transmission frequency on the second common terminal of said switch;
   an FDD transmission band selection means having at least a band selection means which is connected to the first terminal of said switch;
   a TDD transmission-reception band selection means having at least a band selection means which is connected to the second terminal of said switch; and
   an FDD demodulation means having a demodulation unit and converting an FDD reception signal into an intermediate frequency and then demodulating the signal;
   said Time Division Multiple Access FDD/TDD dual mode system being characterized in that the first common terminal of said switch is connected to the second terminal at the TDD reception whereas the second common terminal is connected to the first terminal at the TDD transmission, and to the second terminal at the TDD transmission.

2. The Time Division Multiple Access FDD/TDD dual mode system according to claim 1 wherein the demodulation unit of said TDD demodulation means and the demodulation unit of said FDD demodulation means are the same, and the demodulation unit has two inputs for a TDD signal which has been converted into said intermediate frequency and an FDD signal which has been converted into said intermediate frequency.

3. The Time Division Multiple Access FDD/TDD dual mode system according to claim 1 characterized in that said switch is a two-terminal vs. two-common-terminal matrix switch.

4. A Time Division Multiple Access TDD dual band system comprising:
   a switch including first, second, and third common terminals and first and second terminals, said first, second, and third common terminals are connected to said first and second terminals exclusively from each other;
   a first demodulation means including a demodulation unit and demodulating a first frequency reception signal from the first common terminal of said switch after converting said reception signal into an intermediate frequency;
   a second demodulation means including a demodulation unit and demodulating a second frequency reception signal from the second common terminal of said switch after converting said reception signal into an intermediate frequency;
   a transmission modulation signal generation means for modulating a carrier signal by a transmission signal and impressing a signal which has been converted into the first transmission frequency or the second transmission frequency on the third common terminal of said switch;
   a first frequency transmission-reception band selection means having at least a band selection means which is connected to the first terminal of said switch;
   a second frequency transmission-reception band selection means having at least a band selection means which is connected to the second terminal of said switch; and said Time Division Multiple Access TDD dual band system being characterized in that the first common terminal of said switch is connected to the first terminal at the first frequency reception, the second common terminal of said switch is connected to the second terminal at the second frequency reception, and the third common terminal of said switch is connected to the first terminal at the first frequency transmission, and connected to the second terminal at the second frequency transmission.

5. The Time Division Multiple Access TDD dual band system according to claim 4 wherein said switch is a two-terminal vs. three-common-terminal matrix switch.

6. A Time Division Multiple Access TDD dual band system comprising:
- a switch including first and second common terminals and first and second terminals, said first and second common terminals are connected to said first and second terminals exclusively from each other;
- a demodulation means including a demodulation unit and demodulating a first frequency reception signal or a second frequency reception signal from the first common terminal of said switch after converting said reception signal into an intermediate frequency;
- a transmission modulation signal generation means for modulating a carrier signal by a transmission signal and impressing a signal which has been converted into a first transmission frequency or a second transmission frequency on the second common terminal of said switch;
- a first frequency transmission-reception band selection means having at least a band selection means which is connected to the first terminal of said switch;
- a second frequency transmission-reception band selection means having at least a band selection means which is connected to the second terminal of said switch; and
- said Time Division Multiple Access TDD dual band system being characterized in that the first common terminal of said switch is connected to the first terminal at the first frequency reception and to the second terminal at the second frequency reception, whereas the second common terminal of said switch is connected to the first terminal at the first frequency transmission and to the second terminal at the second frequency transmission.

7. The Time Division Multiple Access TDD dual band system according to claim 6 wherein said switch is a two-terminal vs. two-common-terminal matrix switch.

8. The Time Division Multiple Access FDD/TDD dual mode system according to claim 2 wherein said switch is a two-terminal vs. two-common-terminal matrix switch.

* * * * *